(12) United States Patent
Fuchs et al.

(10) Patent No.: US 7,435,965 B2
(45) Date of Patent: Oct. 14, 2008

(54) X-RAY DETECTOR AND METHOD FOR PRODUCTION OF X-RAY IMAGES WITH SPECTRAL RESOLUTION

(75) Inventors: Manfred Fuchs, Nürnberg (DE); Detlef Mattern, Erlangen (DE); Peter Schardt, Höchstadt A.D. Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 245 days.

(21) Appl. No.: 10/886,343

(22) Filed: Jul. 7, 2004

(65) Prior Publication Data

US 2005/0006588 A1  Jan. 13, 2005

(30) Foreign Application Priority Data

Jul. 7, 2003  (DE) ................ 103 30 595

(51) Int. Cl.
G01T 1/20  (2006.01)
(52) U.S. Cl. .............. 250/367; 250/370.11
(58) Field of Classification Search ......... 250/367, 250/370.11
See application file for complete search history.

(56) References Cited

U.S. PATENT DOCUMENTS

| | | | | |
|---|---|---|---|---|
| 3,955,269 | A * | 5/1976 | Magdo et al. ............ 438/207 |
| 4,250,385 | A * | 2/1981 | Luderer et al. .......... 250/363.02 |
| 4,511,799 | A * | 4/1985 | Bjorkholm ............. 250/367 |
| 4,626,688 | A | 12/1986 | Barnes |
| 4,709,382 | A | 11/1987 | Sones |
| 5,227,635 | A * | 7/1993 | Iwanczyk ............ 250/370.12 |
| 5,548,123 | A * | 8/1996 | Perez-Mendez et al. ...... 250/370.11 |
| 5,841,126 | A * | 11/1998 | Fossum et al. ......... 250/208.1 |
| 5,880,470 | A * | 3/1999 | Umetani et al. ........ 250/370.09 |
| 6,069,361 | A | 5/2000 | Rubinstein |
| 6,303,943 | B1 * | 10/2001 | Yu et al. ............... 257/40 |
| 6,392,237 | B1 | 5/2002 | Agano |
| 6,445,765 | B1 | 9/2002 | Frank et al. |
| 7,081,627 | B2 | 7/2006 | Heismann et al. |
| 2002/0011571 | A1 * | 1/2002 | Lin et al. ............. 250/366 |
| 2004/0113085 | A1 * | 6/2004 | Heismann et al. ...... 250/370.09 |

FOREIGN PATENT DOCUMENTS

| | | |
|---|---|---|
| DE | 37 32 820 A1 | 4/1989 |
| DE | 100 44 357 A1 | 3/2002 |
| DE | 102 44 176 A1 | 4/2004 |
| WO | WO 99/09603 | 2/1999 |

OTHER PUBLICATIONS

Artikel von Christoph Brabec et al, Adv., Funct. Mater. 2001, 11, No. 1, February, S. 15-26.
Artikel von R. F. Schulz, Fortschr Rontgenstr 2001, 173, S. 1137-1146.

* cited by examiner

*Primary Examiner*—David P. Porta
*Assistant Examiner*—Shun Lee
(74) *Attorney, Agent, or Firm*—Schiff Hardin LLP

(57) ABSTRACT

The invention concerns an x-ray detector with a plurality of layers arranged one top of one another in the incident direction of the x-rays, whereby each of the layers comprises at least one photodiode and a luminophore layer applied thereon.

17 Claims, 1 Drawing Sheet

X-RAY DETECTOR AND METHOD FOR PRODUCTION OF X-RAY IMAGES WITH SPECTRAL RESOLUTION

BACKGROUND OF THE INVENTION

The invention concerns an x-ray detector and method for production of x-ray images with spectral resolution.

According to the prior art, for example from Schulz R. F., "Fortschr Röntgenstr" 2001; 173: 1137-1146, x-ray detectors are known for various methods for producing x-ray images. These are predominantly solid-state detectors. Such solid-state detectors are generally comprised of a photodiode matrix formed from a plurality of photodiodes. The photodiode matrix is overlaid by a luminophore layer. Incident x-ray radiation is absorbed with the luminophore layer. Light is formed which is detected by the photodiodes and is conveyed to downstream evaluation electronics for evaluation.

To produce a spatially-resolved image of the incident x-ray intensity distribution, the x-ray intensity measured with each photodiode is evaluated and represented as a pixel. An integral signal measured over the entire layer thickness of the luminophore layer is thereby always evaluated. With the known method, no conclusion is possible about the spectral properties of the measured x-ray radiation.

Apart from this, the production of conventional solid-state detectors requires high costs. A photodiode matrix formed from amorphous silicon and a luminophore layer formed via vapor deposition in a vacuum, for example from needle-shaped/spicular CsI, are produced in separate production methods. The luminophore layer is subsequently bonded to the photodiode matrix. Such solid-state detectors are fashioned flat and rigid, conditional upon production. A variant shaping requires additional effort. For example, to produce a curved x-ray detector for x-ray computer tomography, photodiodes with cuboid- or cube-shaped scintillation bodies applied thereto are individual mounted on a curved carrier.

SUMMARY OF THE INVENTION

It is the object of the invention to remedy the disadvantages according to the prior art. In particular, an optimally simple and cost-effectively producible x-ray system is provided with which the spectral properties of x-rays can be measured with spatial resolution. A further object is to provide a method to produce x-ray images with spectral resolution.

This object is achived by an X-ray detector, comprising: a plurality of layers arranged having a bottom layer and at least one layer stacked on top of the bottom layer in a direction parallel to a direction of the x-rays, each of the layers comprising at least one photodiode and a luminophore layer applied thereon.

This object is also achived by a method to produce x-ray images with spectral resolution, comprising: providing an x-ray detector; measuring in a spatially-resolved manner the x-ray spectrum; and producing a spectrally-resolved x-ray image. These aspects and other embodiments of the invention are explained in more detail below.

According to a requirement of the invention, an x-ray detector is provided with a plurality of layers arranged on top of one another in the incident direction of the x-rays, whereby each of the layers comprises at least one photodiode and an x-ray luminophore layer applied thereon.

Such an x-ray detector fashioned in this multi-layer manner enables a spatially resolved measurement of the spectral properties of incident x-ray radiation. X-ray quanta of low energy are already absorbed in an uppermost layer relative to the x-ray source. X-ray quanta of higher energy penetrate deeper into the stack formed from the layers. They can also still be measured in the deeper layers. The spectral properties of the x-rays incident on each point of an incident surface can be inferred from the intensities measured in the layers. X-rays are specifically absorbed upon penetration through tissue, bones and the like. The spectrum of the x-rays changes specifically dependent on the penetrated material. With the proposed x-ray detector, spectrally-resolved x-ray images can be produced that contain specific information about the penetrated material.

The following discussion details various embodiments of the invention. According to an embodiment, the photodiode is a component of a photodiode matrix formed from a plurality of photodiodes. Such a photodiode matrix can also be a photodiode array of an x-ray computer tomograph. Each photodiode can be connected with an amplifier arranged in the layer, this amplifier preferably comprising a switching transistor and/or amplification transistor as well as a wire. This makes it possible to immediately amplify the signals acquired by the photodiodes and to forward them to downstream evaluation electronics. The problems of the transmission of unamplified signals over long signal paths known from the prior art can thereby be prevented.

According to a further embodiment, the luminophore layer is fashioned as a closed layer overlaying the photodiode matrix. It can also be that each layer comprises a plurality of detector elements discretely separated from one another that are respectively formed from a photodiode with a luminophore layer applied thereon. In the gap formed between the detector elements, an amplifier, switching transistor or the like can, for example, be situated. The detector elements of a first layer can be arranged offset relative to the detector elements of a second layer lying on top of them. A third layer lying on the second layer can in this case again be arranged congruent with the first layer. This very simply arranges an amplifier for intensifying the measured signals within a layer in direct proximity to the photodiodes.

A light-reflecting layer or a further photodiode, preferably a further photodiode matrix, can be provided on the luminophore layer. The provision of a light-reflecting layer improves the signal conversion of the x-ray quanta absorbed in the luminophore layer. Light formed via the absorption of the x-ray quanta is reflected on the light-reflecting layer and additionally projected onto the photodiode.

As an alternative to the provision of a light-reflecting layer, a further photodiode (preferably a further photodiode matrix) can also be provided on the luminophore layer. It is thereby possible with the photodiode or photodiode matrix to detect light exiting on the top side of the luminophore layer. An improved efficiency of the proposed x-ray detector is also thereby achieved.

The luminophore layer can be 20 to 500 μm thick, preferably 50 to 200 μm thick. Ideally, the luminophore layer can be 100 μm. Such luminophore layers can, for example, be produced in silk-screen printing (serigraphy).

According to a further particularly advantageous embodiment, the photodiode is produced in the form of a thin layer with a thickness of at most 50 μm, but preferably in the range of 0.5 to 1.5 μm. The photodiode is appropriately produced from a material with an average atomic number of $Z<14$, preferably $Z<10$. It can in particular be produced from a semiconducting organic material.

The production of components such as photodiodes for transistors and the like on the basis of semiconducting polymers is, for example, known from Brabec Chrispoh et al., "Adv. Funci. Mater." 2001. 11, Nr. 1, pages 15 through 26.

This reference is herein incorporated by reference. According to this reference, particularly photodiodes can be produced on the basis of semiconducting polymers, for example, at a thickness of 100 nm. Due to their low thickness and the low atomic number of the polymer materials used for production, the layer barely absorbs any x-rays. Using such layers, it is possible to fashion the proposed x-ray detector with a plurality of layers lying atop one another.

The photodiode can be applied on a formed substrate, preferably made from a film. The film is, for example, produced from aluminum or plastic. It is flexible and enables overall the production of a flexible x-ray detector. An adaptation of the shape of the x-ray detector to design factors is possible without anything further. The x-ray detector can thus, for example, be curved.

The luminophore layer is appropriately produced from a scintillator material selected from one of the following groups: gadolinium oxide sulfide, CsI, NaI and the like.

It has proven to be particularly appropriate to produce the luminophore layer of at least two layers made from different scintillator materials. A luminophore layer of an upper (relative to the incident direction) layer can thereby exhibit a smaller x-ray absorption coefficient than a further luminophore layer of a layer arranged underneath. This enables an increase of the spectral contrast between the individual layers.

Particularly given the use of semiconducting organic polymers to produce the photodiode/photodiode matrix, the proposed x-ray detector can be produced via printing methods, preferably silk-screen printing methods. It is thereby possible to simply and quickly produce the entire x-ray detector with silk-screen methods, omitting expensive vacuum methods. For this, the corresponding layers are printed one after the other via suitable masks. A flexible, one-piece x-ray detector produced from a plurality of layers can thereby be prepared simply and cost-effectively.

According to a further embodiment of the invention, a method is provided with the following steps to produce x-ray images with spectral resolution: providing an inventive x-ray detector, spatially-resolved measuring of the x-ray spectrum, and producing a spectrally-resolved x-ray image.

With the proposed method, for each image point or for each pixel, the spectrum of the x-ray radiation incident thereon can be determined. Information about the material penetrated with the x-ray radiation can be acquired from this. This information can be advantageously used to produce the x-ray image.

According to an embodiment of the invention, the signals measured with the overlapping photodiodes are added for spatially-resolved measurement of the x-ray spectrum. However, for spatially-resolved measurement of the x-ray spectrum it is also possible to evaluate the signals measured with the overlapping photodiodes dependent on a z-position of the layer. The z-position specifies the separation of the layer from an x-ray source. Thus, for example, the intensities measured in specific layers can be compared and/or separately evaluated.

It has proven to be particularly appropriate to produce a false-color image as a spectrally-resolved x-ray image. For example, in such a representation, only soft parts, specific tissue types or bones can be shown. The information content of an x-ray image is therewith significantly increased. The diagnosis possibilities with such false-color images are improved.

DESCRIPTION OF THE DRAWINGS

Exemplary embodiments of the invention are subsequently explained in detail using the following drawings.

DETAILED DESCRIPTION OF THE PREFERRED EMBODIMENTS

Figure 1:
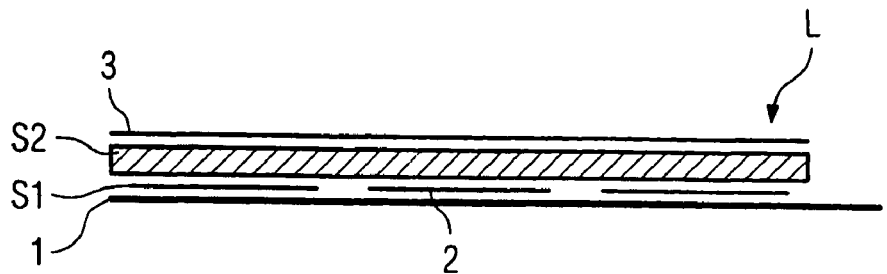
FIG. 1 is a schematic section view of a layer.

In the layer L shown in FIG. 1, a photodiode matrix formed from a plurality of photodiodes 2 is applied on a film 1. The photodiode matrix is produced from organic semiconductors. A thickness of one of the layers S1 forming the photodiode matrix is approximately 100 nm. A luminophore layer S2 that exhibits a thickness of approximately 100 μm is located on the layer S1. The luminophore layer S2 can be produced from conventional luminophores, for example pulverized gadolinium oxide sulfide. The luminophore layer S2 is in turn overlaid by a light-reflecting layer 3.

Figure 2:
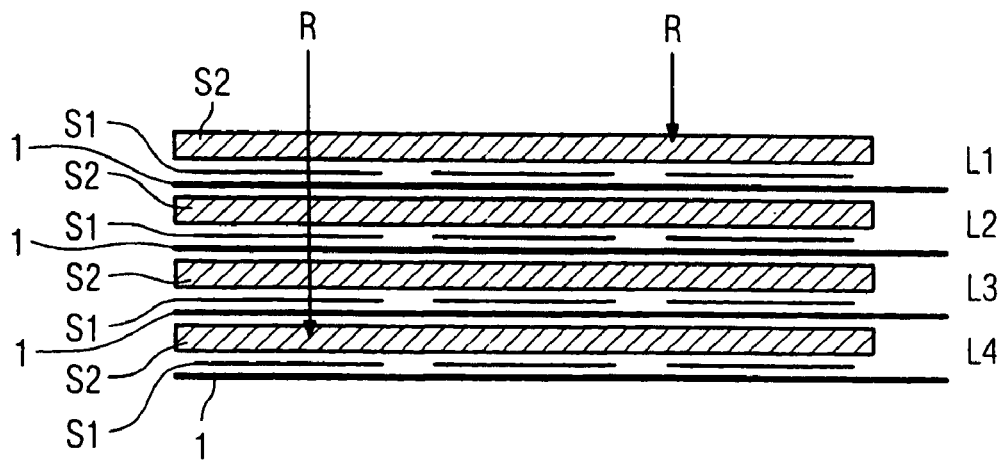
FIG. 2 is a schematic section view of a first x-ray detector.

The first x-ray detector shown in FIG. 2 is assembled from four layers L1, L2, L3 and L4 stacked on top of one another. The layers L1, L2, L3 and L4 are designed similar to the layer shown in FIG. 1; however, the light-reflecting layer 3 has been omitted. Given a suitable design, the function of the light-reflecting layer can also be fulfilled by the film 1. The photodiodes 2 of each layer (L1, L2, L3, L4) are arranged such that they lie congruent one below the other. Penetrating x-ray radiation is designated in the first x-ray detector with the reference character R.

Figure 3:
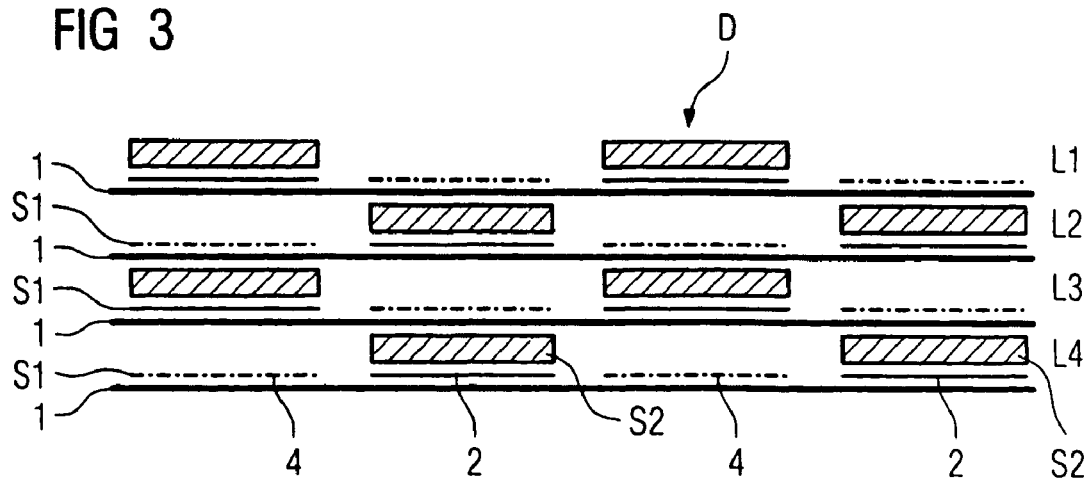
FIG. 3 is a schematic section view of a second x-ray detector.

The second x-ray detector shown in FIG. 3 is likewise comprised of four layers L1, L2, L3 and L4 stacked on top of one another. Each of the layers L1, L2, L3 and L4 comprises a film 1 as a substrate. The photodiodes 2 are arranged separated from one another in the layer S1. Intensifiers 4 produced from polymer semiconductors are arranged in the gaps formed between the photodiodes 2. A luminophore layer S2 is applied on each of the photodiodes 2. Each photodiode 2 forms a detector element D together with the luminophore layer S2 applied to it. The detector elements 2 of two of the overlapping layers L1, L2, L3 and L4 are respectively arranged displaced by a distance such that a gap of the nearest layer is located over a detector element D and in turn a detector element D is arranged over a gap of the nearest layer. The proposed second x-ray detector is particularly advantageous. With it, the signals measured by the photodiodes 2 can be directly intensified within the layer S1 via the intensifier 4 associated with the photodiodes 2 and be forwarded to downstream evaluation electronics.

The function of the control and regulation devices is as follows.

Incident x-ray radiation R exhibits a spectrum at each point of the incident surface. A point of the incident surface is here, for example, specified by the surface covered by a photodiode 2. X-rays R with a high energy penetrate deep into the x-ray detector and can—as shown in FIG. 2—e.g., still be measured in the lowermost layer L4. In contrast to this, x-rays R with a low energy are, e.g., already absorbed in the uppermost layer L1. The spectrum of the x-ray radiation incident at each point can be determined from the portions of the absorbed x-ray radiation measured in the layers L1, L2, L3 and L4. For this, the respective portions of absorbed x-ray radiation of the overlapping layers can be separately evaluated and, e.g., converted into a false-color image. Characteristic spectral distributions can, e.g., be associated with specific penetrated materials, and therewith a distribution image of a predetermined material can be produced.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

REFERENCE LIST

| 1 | film |
|---|---|
| 2 | photodiode |
| 3 | light-reflecting layer |
| 4 | amplifier |
| L1, L2, L3, L4 | layer |
| S1 | layer |
| S2 | luminophore layer |
| R | x-ray radiation |
| D | detector element |

What is claimed is:

1. An X-ray detector, comprising:
   a plurality of layers arranged having a bottom layer and at least a second layer, a third layer and a fourth layer stacked on top of the bottom layer in succession in a direction parallel to a direction of the x-rays, each of the plurality of layers comprising:
   at least one photodiode that is produced from a semiconducting organic material and is applied on a film sub-layer, and a luminophore sub-layer applied on the photodiode, and a light-reflecting sub-layer provided on the luminophore sub-layer,
   the bottom layer comprising a photodiode matrix formed of a plurality of photodiodes that include the at least one photodiode of the bottom layer;
   the second layer comprising a photodiode matrix formed of a plurality of photodiodes that include the at least one photodiode of the second layer;
   said third layer comprising a photodiode matrix formed of a plurality of photodiodes that include the at least one photodiode of said third layer;
   said fourth layer comprising a photodiode matrix formed of a plurality of photodiodes that include the at least one photodiode of the fourth layer;
   the at least one photodiode of the bottom layer being arranged displaced relative to the at least one photodiode of the second layer;
   the at least one photodiode of the third layer being arranged displaced relative to the at least one photodiode of the fourth layer, with the at least one photodiode in each of said bottom layer and said third layer overlying one another, and the at least one photodiode in each of said second and fourth layers overlying one another to spectrally resolve an x-ray spectrum that is incident on said plurality of layers; and
   an amplifier associated with the at least one photodiode in said bottom layer in said bottom layer directly below the at least one photodiode in said second layer.

2. The X-ray detector according to claim 1, wherein the at least one photodiode in each of the plurality of layers is connected with an amplifier arranged in the appertaining layer comprising at least one of a switching transistor and an amplifier transistor as well as a wire.

3. The X-ray detector according to claim 1, wherein the luminophore layer is fashioned as a closed layer overlaying the photodiode matrix.

4. The X-ray detector according to claim 1, wherein each of the plurality of layers comprises a plurality of discrete detector elements separated from one another that are respectively formed from the at least one photodiode with the luminophore layer applied thereon.

5. The X-ray detector according to claim 1, wherein the luminophore layer has a thickness of 20 to 500 μm.

6. The X-ray detector according to claim 5, wherein the luminophore layer has a thickness of 50 to 200 μm.

7. The X-ray detector according to claim 1, wherein the at least one photodiode is formed as a thin layer with a thickness of at most 50 μm.

8. The X-ray detector according to claim 7, wherein the at least one photodiode is formed as a thin layer with a thickness of between 0.5 to 1.5 μm.

9. The X-ray detector according to claim 1, wherein the luminophore layer is produced from a scintillator material selected from the group consisting of gadolinium oxide sulfide, CsI, and NaI.

10. The X-ray detector according to claim 1 wherein the luminophore layer of at least two of the luminophore layers of the plurality of layers are made from different scintillator materials.

11. The X-ray detector according to claim 1, wherein a luminophore layer of an upper, relative to the incident direction, layer of the plurality of layers exhibits a smaller x-ray absorption coefficient than a further luminophore layer of a layer of the plurality of layers arranged underneath.

12. The X-ray detector according to claim 1, wherein the film is a flexible film.

13. A method for utilizing an X-ray detector with spectral resolution, comprising:
   providing a plurality of layers including a bottom layer, a second layer, a third layer and a fourth layer, and arranging said plurality of layers with said second, third and fourth layers stacked in succession on top of the bottom layer in a direction parallel to a direction of the x-rays;
   forming each of the plurality of layers to comprise
   at least one photodiode that is produced from a semiconducting organic material and is applied on a film sub-layer, and a luminophore sub-layer applied on the photodiode, and a light-reflecting sub-layer provided on the luminophore sub-layer, in the bottom layer, providing a photodiode matrix formed of a plurality of photodiodes that include the at least one photodiode of the bottom layer;

in the second layer, providing a photodiode matrix formed of a plurality of photodiodes that include the at least one photodiode of the second layer;

in said third layer, providing a photodiode matrix formed of a plurality of photodiodes that include the at least one photodiode of the third layer;

in the fourth layer, providing a photodiode matrix formed of a plurality of photodiodes that include the at least one photodiode of the fourth layer;

arranging the at least one photodiode of the bottom layer displaced relative to the at least one photodiode of the second layer;

arranging the at least one photodiode of the third layer displaced relative to the at least one photodiode of the fourth layer;

arranging the at least one photodiode of the third layer to over layer to overlap the at least one photodiode of the bottom layer and arranging the at least one photodiode of the fourth layer to overlap the at least one photodiode of the second layer to produce an x-ray detector that spatially resolves an x-ray spectrum incident on said plurality of layers; and providing an amplifier associated with the at least one photodiode in said bottom layer is arranged in said bottom layer directly below the at least one photodiode in said second layer; and measuring the x-ray spectrum in a spectrally resolved manner with said x-ray detector to produce the x-ray spectrum; and producing a spectrally-resolved x-ray image.

14. The method according to claim 13, further comprising:
adding signals measured with overlapping photodiodes of the x-ray detector for spatially-resolved measuring of the x-ray spectrum.

15. The method according to claim 14, further comprising:
evaluating, depending on a z-position of a layer, the signals measured with the overlapping photodiodes for spatially-resolved measurement of the x-ray spectrum.

16. The method according to claim 13, further comprising:
producing a false-color image as the a spectrally-resolved x-ray image.

17. A method as claimed in claim 13 comprising:
forming each of said bottom layer and said second, third and fourth layers by:
applying said at least one photodiode produced from a semiconducting organic material on a film sub-layer;
applying a luminophore sub-layer on said at least one photodiode; and
applying a light-reflecting sub-layer on the luminophore sub-layer.

* * * * *